United States Patent [19]

Durgan et al.

[11] 4,123,906
[45] Nov. 7, 1978

[54] VEHICLE HAVING PORTABLE POWER MEANS FOR BRAKE CONTROL

[75] Inventors: Virgil R. C. Durgan, Tremont; Robert W. Harper; Arthur J. Ritter, Jr., both of Metamora, all of Ill.

[73] Assignee: Caterpillar Tractor Co., Peoria, Ill.

[21] Appl. No.: 804,642

[22] Filed: Jun. 8, 1977

[51] Int. Cl.² ............................................. F15B 13/09
[52] U.S. Cl. ...................................... 60/403; 60/406; 60/486; 180/6.48
[58] Field of Search ................. 60/403, 404, 405, 406, 60/420, 486; 180/6.48

[56] References Cited

U.S. PATENT DOCUMENTS

| 2,396,984 | 3/1946 | Broadston et al. ...................... 60/404 |
| 2,512,119 | 6/1950 | Stone et al. ......................... 60/403 X |
| 3,940,931 | 3/1976 | Renfro et al. ........................... 60/403 |

*Primary Examiner*—Edgar W. Geoghegan
*Attorney, Agent, or Firm*—John L. James

[57] ABSTRACT

A vehicle has elements providing a fluid pathway to the controlling system of spring actuated, normally locked brakes that are fluid releasable. The elements forming the fluid pathway are connectable to a fluid power assembly that is movable to and from the vehicle and releasably connected to the fluid pathway.

6 Claims, 1 Drawing Figure

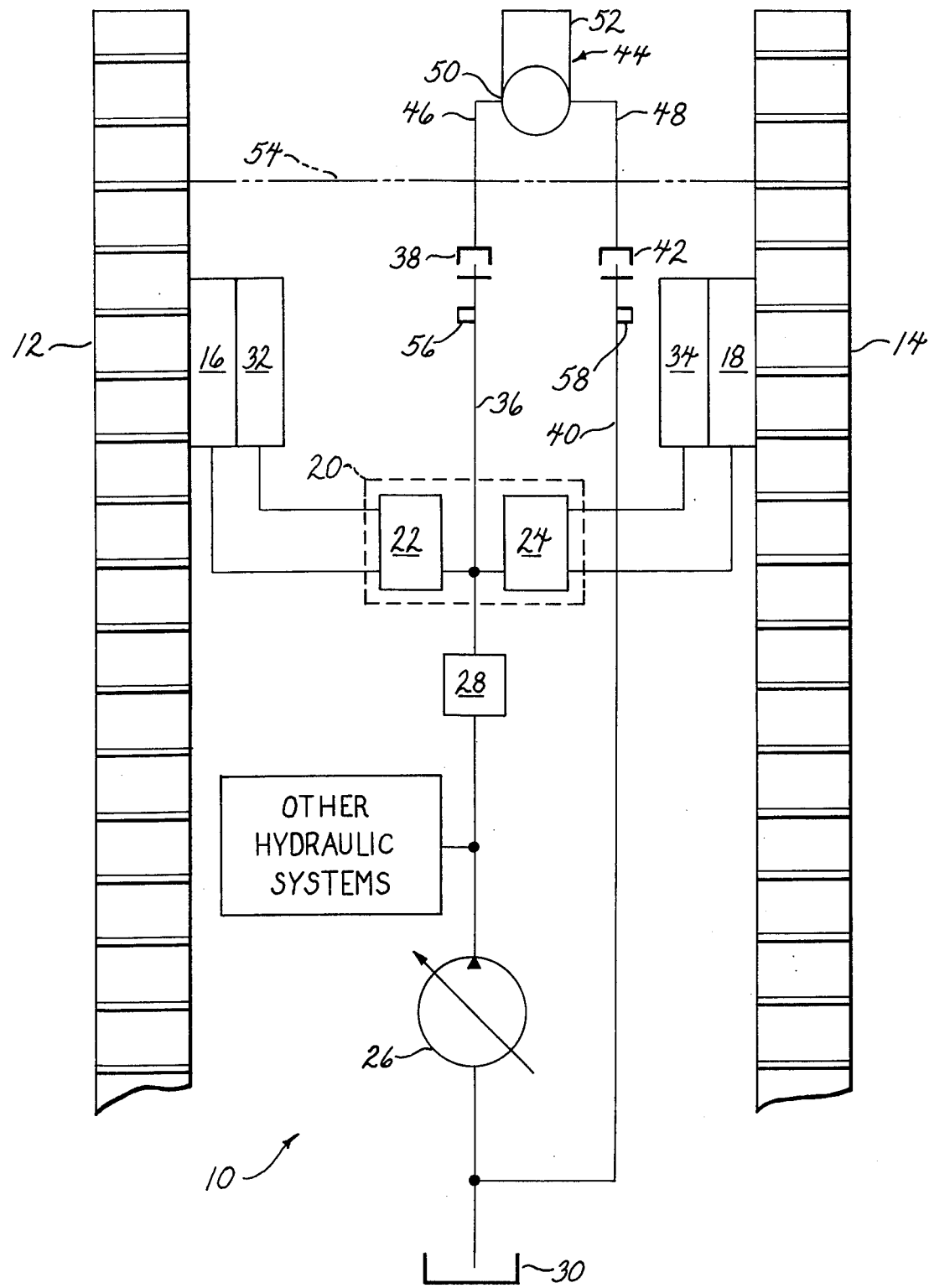

VEHICLE HAVING PORTABLE POWER MEANS FOR BRAKE CONTROL

BACKGROUND OF THE INVENTION

Work vehicles having track or wheel type locomotion are generally of large size and great weight. These type vehicles often operate on steep grades and are therefore equipped with a braking system that is spring locked and released in response to fluid pressure. Therefore, in absence of fluid power to controlling assemblies of the brakes, the brakes are locked.

Owing to the rough, abusive use of these vehicles, the fluid power system of the vehicle sometimes malfunctions. In order to move the vehicle for servicing, it then becomes necessary to provide a method by which to release the brakes for transportation of the vehicle to a servicing site.

Some heretofore utilized vehicles have redundant power supplies for automatic or manual actuation upon failure of the main fluid power means. However, since such malfunction is generally most infrequent, it is desirable to eliminate the redundant system from the vehicle and provide other means for releasing the brakes and thereby avoid the waste of material and labor.

The present invention is directed to overcoming one or more of the problems as set forth above.

SUMMARY OF THE INVENTION

According to the present invention, a vehicle has first and second fluid releasable brakes, control means connected to the brakes for controllably, selectively passing fluid to the brakes, a fluid power means connected to the control means through a check valve and a fluid reservoir connected to the fluid power means. First and second fluid couplings are connected to respective first and second conduits. A second fluid power means is movable to and from the vehicle and releasably connected to the first and second fluid couplings for receiving fluid from the fluid reservoir and delivering pressurized fluid to the brakes via the control means in the absence of pressurized fluid being deliverable from the first power means.

BRIEF DESCRIPTION OF THE DRAWINGS

The drawing is a diagrammatic view of a portion of te vehicle having apparatus of this invention.

DETAILED DESCRIPTION

Referring to the drawing, a vehicle 10 has first and second locomotion means 12, 14, for example continuous track or wheels, preferably track. First and second brakes 16, 18 are associated with a respective locomotion means 12, 14. The brakes are spring actuated, normally locked brakes that are fluid releasable, as are hereinafter more fully described.

Control means 20, preferably first and second control means 22, 24, are connected to the brakes 16, 18 for controllably, selectively passing fluid to the brakes 16, 18. The control means 20 can be one or more valve assemblies as is known in the art.

A first fluid power means 26, preferably a variable displacement pump, is connected to the control means 20 through a check valve 28 for supplying fluid in one direction from the first power means 26 to the control means 20. A fluid reservoir 30 is connected to the first fluid power means 26 for supplying fluid thereto.

First and second steering clutches 32, 34 are also associated with the control means 20 for receiving pressurized fluid from the first power means 26 and being actuated in response to said received fluid.

First conduit means 36 is connected at one end to a first fluid coupling 38 with the other end in fluid communication with the control means 20 of each brake 16, 18 at a location downstream of the check valve 28 and associated first fluid power means 26. The control means 20 or pair of control means 22, 24 are also preferably associated with first and second steering clutches 32, 34 for controllably delivering pressurized fluid from the control means, 20 or 22, 24, to the clutches 32, 34 for the operation thereof.

It should be also understood that the control means 20 and check valve 28 or control means 22, 24 and check valve 28 are valves (not shown) which can be separate or contained within the same housing without departing from this invention. Where there are a pair of control means 22, 24 there can also be a separate check valve 28 for each respective control means 22, 24.

The conduit means 36, 40 are also preferably connected by brackets 56, 58 for example, to the vehicle 10 adjacent to the outer periphery 54 of the vehicle 10 for positioning the couplings 38, 42 at an easy accessible location relative to the ground.

In the operation of this invention upon the absence of pressurized fluid deliverable from the first fluid power means 26 and when the brakes 16, 18 are desired to be released for moving the vehicle 10, an operator moves the second fluid power means 44 to the vehicle, quick connects the fluid couplings 38, 42, and acutates the second fluid power means 44 which is powered by a battery 52. The pump 50 draws fluid from the reservoir 30, pressurizes said fluid and delivers it via conduit 36 to the control means 20. Actuation of the pressurized control means 20, as is known in the art, delivers the pressurized fluid to the brakes 16, 18 for selectively releasing one or both brakes and allowing the vehicle to be moved or towed to a remote location for repair.

By the construction of this invention, fluid from the second fluid power means 44 is deliverable only to the brakes 16, 18 or the brakes 16, 18 and the steering clutches 32, 34. The check valve 28 and conduit system prevent this fluid from being delivered into other hydraulic systems (not shown) which are served by the first fluid power means 26. The second fluid power means 44 can therefore be of relatively small size and easily portable and connectable into the fluid system. This invention also eliminates a waste of materials, labor and equipment in providing a vehicle contained redundant power system and/or mechanical brake release apparatus.

The embodiments of the invention in which an exclusive property or privilege is claimed are defined as follows:

1. In a vehicle having first and second spring actuated, normally locked brakes that are fluid releasable, fluid means connected to the brake for controllably, selectively passing fluid to the brakes, a first fluid power means connected to the control means through a check valve for supplying pressurized fluid through the check valve, and a fluid reservoir connected to the fluid power means, the improvement comprising:

first and second fluid couplings;
first conduit means connected to one end of the first fluid coupling with the other end being in fluid communication with the control means of each brake at a location downstream of the check valve;

second conduit means connected at one end to the second fluid coupling with the other end being in fluid communication with the reservoir; and a second fluid power means, said second fluid power means being movable to and from the vehicle and releasably connectable to the first and second fluid couplings for receiving fluid from the fluid reservoir and delivering pressurized fluid to the brakes via the control means in the absence of pressurized fluid being deliverable from the first fluid power means.

2. Apparatus, as set forth in claim 1, wherein the first and second couplings are of a quick-release construction.

3. Apparatus, as set forth in claim 1, wherein the second fluid power means has a battery powered pump.

4. Apparatus, as set forth in claim 1, wherein there are a pair of control means, said pair of control means being associated with respective first and second brakes and said first conduit means is in fluid communication with said pair of control means.

5. Apparatus, as set forth in claim 4, including first and second steering clutches each associated with a respective first and second control means for selectively controllably receiving pressurized fluid.

6. Apparatus, as set forth in claim 1, wherein the first and second conduit means are connected by brackets to the vehicle adjacent the outer periphery of said vehicle.

* * * * *